United States Patent
Gallet et al.

(10) Patent No.: US 8,587,780 B2
(45) Date of Patent: Nov. 19, 2013

(54) DEVICE FOR MEASURING THE TWIST OF A ROTATING SHAFT

(75) Inventors: Francois Gallet, Paris (FR); Stephane Rousselin, Hericy (FR)

(73) Assignee: SNECMA, Paris (FR)

( * ) Notice: Subject to any disclaimer, the term of this patent is extended or adjusted under 35 U.S.C. 154(b) by 220 days.

(21) Appl. No.: 13/143,622

(22) PCT Filed: Jan. 7, 2010

(86) PCT No.: PCT/FR2010/050014
§ 371 (c)(1),
(2), (4) Date: Jul. 7, 2011

(87) PCT Pub. No.: WO2010/079300
PCT Pub. Date: Jul. 15, 2010

(65) Prior Publication Data
US 2011/0273724 A1    Nov. 10, 2011

(30) Foreign Application Priority Data

Jan. 8, 2009  (FR) ...................................... 09 50078

(51) Int. Cl.
*G01L 3/08*   (2006.01)
*G01J 4/00*   (2006.01)

(52) U.S. Cl.
USPC .......................................... 356/364; 250/225

(58) Field of Classification Search
CPC .................................... G01L 3/08; G01L 3/12
USPC ........... 356/364, 366–368, 614, 138; 250/225
See application file for complete search history.

(56) References Cited

U.S. PATENT DOCUMENTS

| 3,423,593 | A | * | 1/1969 | Chinnock ................... 250/206.2 |
| 3,938,890 | A | | 2/1976 | Flavell |
| 4,874,245 | A | * | 10/1989 | Spillman et al. .............. 356/364 |
| 5,051,551 | A | * | 9/1991 | Doyle ......................... 250/341.2 |
| 5,389,780 | A | | 2/1995 | Anderson |
| 2008/0156972 | A1 | | 7/2008 | Vahabzadeh et al. |

FOREIGN PATENT DOCUMENTS

| FR | 2 828 278 | 2/2003 |
| JP | 55 39019 | 3/1980 |

OTHER PUBLICATIONS

International Search Report issued Apr. 22, 2010 in PCT/FR10/50014 filed Jan. 7, 2010.

* cited by examiner

*Primary Examiner* — Gregory J Toatley
*Assistant Examiner* — Rufus Phillips
(74) *Attorney, Agent, or Firm* — Oblon, Spivak, McClelland, Maier & Neustadt, L.L.P.

(57) ABSTRACT

Measuring the twist of a rotating shaft by means of a laser beam and polarizing filters. The measurement device includes a laser beam generator, two polarizing filters secured to the shaft and spaced apart from each other, and a laser radiation receiver receiving the laser beam after it has passed through both filters.

7 Claims, 2 Drawing Sheets

DEVICE FOR MEASURING THE TWIST OF A ROTATING SHAFT

The invention relates to measuring the twist of a rotating shaft, and it relates more particularly to a device that is light in weight and accurate, and that makes it possible to measure directly the twist of said rotating shaft, and advantageously to deduce therefrom the torque it is transmitting. Amongst other things, the invention makes it possible to monitor continuously whether the value of said twist remains below a critical value beyond which breakage is possible. The invention applies in particular to measuring the twist of a fan shaft in an airplane turbojet, however its principle may also be applied to other propulsion systems, in particular to a turbojet having two contrarotating propellers.

In a bypass turbojet, there is no device for directly measuring the twist of the "low-pressure" shaft that drives the fan. Nevertheless, such information would be useful, not only for monitoring the operation of the turbojet, but also for being in a position to predict a failure.

Such a turbojet is generally fitted with a mechanical device for measuring the torque delivered by the turbine.

That device is heavy and not very accurate.

Document WO 2004/067215 is also known, and it describes electromagnetic means for measuring the twist of a shaft.

The invention proposes an optical device for measuring the twist of such a shaft.

More particularly, the invention provides a device for measuring the twist of a rotating shaft, in particular a drive shaft, the device comprising a laser beam generator, two polarizing filters secured to the shaft and spaced apart from each other, and a laser radiation receiver, said generator being installed so that the laser beam it emits passes through both filters, and said receiver being installed to receive said beam after it has passed through both of the filters, the device being characterized in that a reflection system is installed in the vicinity of such a filter to reflect the beam that has passed through the filter and return it parallel to itself towards said receiver, and in that said reflection system comprises a 45° frustoconical mirror.

In an advantageous embodiment, the two filters are mounted on the shaft itself, in the vicinity of respective ones of its two ends. When the shaft is hollow, both filters are advantageously installed inside the shaft.

According to another advantageous characteristic, the generator and the receiver are arranged perpendicularly to the axis of rotation of the shaft and on either side thereof, in such a manner that their optical axes are in alignment. However, another 45° frustoconical mirror carried by said shaft is placed between the emitter and the receiver.

According to another advantageous characteristic, one of the filters comprises a ring of polarizing zones and of non-polarizing zones in alternation, so as to obtain a periodic succession of polarizations representative of a measurement value and of a reference value.

This provides a kind of continuous calibration for the measurement system.

The invention can be better understood and other advantages thereof appear more clearly in the light of the following description of a device for measuring the twist of a rotary shaft in accordance with the principle of the invention, given purely by way of example, and made with reference to the accompanying drawings, in which.

Figure 1:
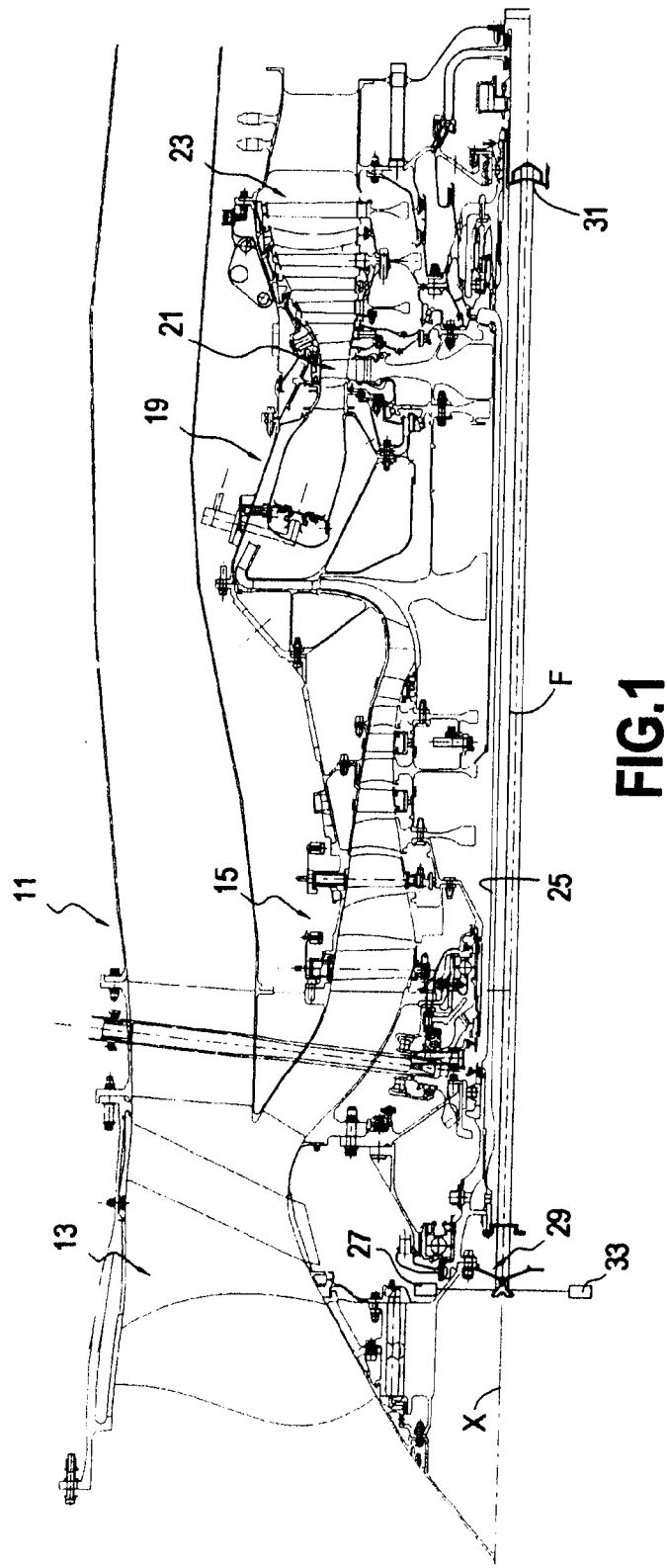
FIG. 1 is a diagrammatic general view in longitudinal half-section of a bypass turbojet fitted with a twist measurement device in accordance with the invention.
Figure 2:
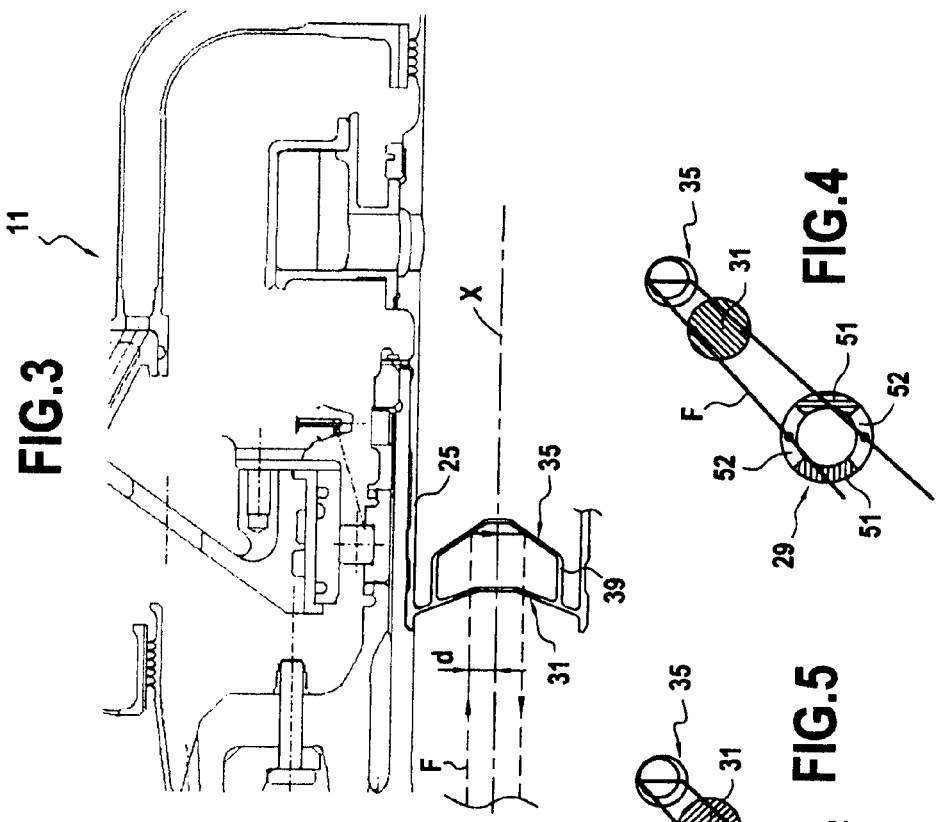
FIG. 2 is a fragmentary view on a larger scale showing the upstream portion of the device.
Figure 3:
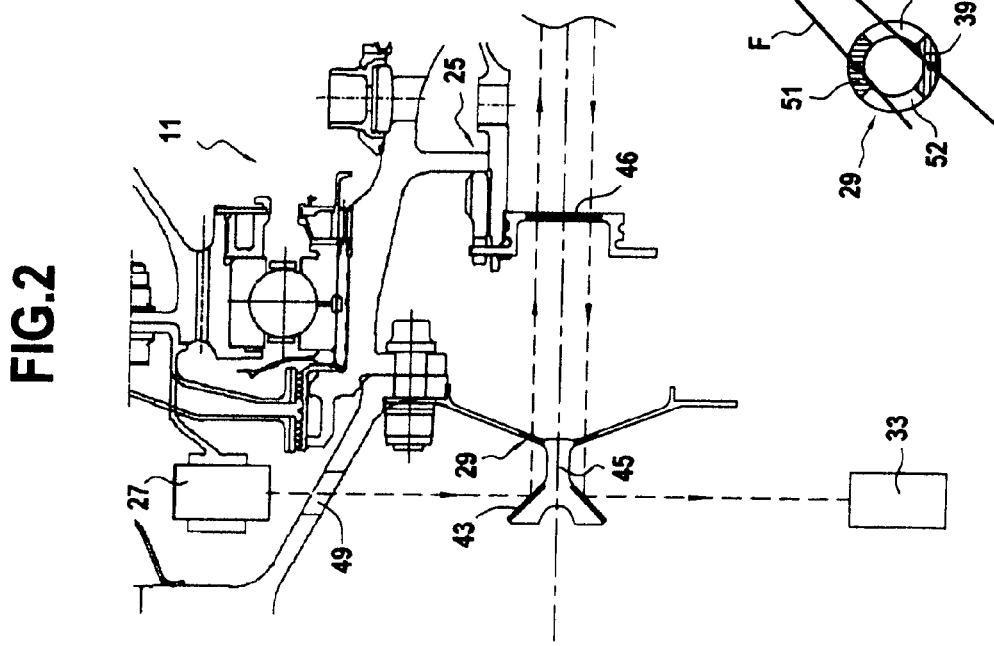
FIG. 3 is a diagrammatic view on a larger scale showing the downstream portion of the device.

With reference to FIGS. 1 to 3, there can be seen the main subassemblies of a bypass airplane turbojet 11, namely, from upstream to downstream: a fan 13, a low-pressure compressor 15, a high-pressure compressor 16, a combustion chamber 19, the high-pressure turbine 21, and the low-pressure turbine 23. The low-pressure turbine is connected to a hollow axial shaft 25 of axis X that drives the rotor of the fan 13.

All of these elements are well-known and are not described in greater detail.

The prime object of the invention is to measure continuously the twist angle of the shaft 25. This shaft presents a generally tubular structure that, in the embodiment described, facilitates implanting components of the measurement device in accordance with the invention.

The device comprises a laser beam generator 27, a first polarizing filter 29, a second polarizing filter 31, and a laser radiation receiver 33 of the photoelectric cell type. Both of the filters are secured to the shaft 25. They are arranged to have the laser beam pass through them. The first filter 29, through which the beam passes first, is situated close to the upstream end of the shaft (beside the fan), while the second filter 31, passed through second, is situated close to the downstream end of the shaft (beside the high-pressure turbine).

In general, according to the invention, the generator 27 is installed so that the laser beam passes through both filters, and the receiver 33 is installed to receive the beam after it has passed through both filters.

Furthermore (downstream in this example, a reflection system 35 is installed in the vicinity of one of the filters (here said second filter 31) in order to reflect the beam that has passed through said filter and return it parallel to itself towards said receiver 33. This portion of the device is visible in FIG. 3. More precisely, said second polarizing filter 31 and the reflection system 35 are arranged on a common support 39 installed inside the shaft 25, close to the downstream end, i.e. beside the turbine 23. Arranged axially from upstream to downstream, this support 39 carries said second polarizing filter 31 and a frustoconical mirror at an angle of 45° relative to the axis of rotation X. Consequently, the laser beam F passing a first time through the polarizing filter 31 at a distance d from the axis of rotation X is reflected twice and returned parallel to itself in a direction that is symmetrical relative to the axis of rotation X.

Beside the upstream end of the shaft 25, the laser beam generator 27 and the receiver 33 are arranged facing each other perpendicularly to the axis of rotation X of said shaft and on either side thereof. Their optical axes are thus in alignment, and another 45° frustoconical mirror 43, carried axially by the shaft 25, is placed between the emitter and the receiver. In the vicinity of this upstream end of the shaft, and constrained to rotate together therewith, there is a support 45 carrying, from upstream to downstream, this frustoconical mirror 43 and said first polarizing filter 29.

This arrangement enables the laser beam F emitted by the generator parallel to the axis X to be directed towards the first polarizing filter 29 and enables the beam to be reflected in return towards said receiver 33 after passing a second time through the first polarizing filter 29.

A transparent screen 46 is placed transversely, upstream from the shaft in order to avoid a mist of oil escaping and polluting the equipment in part.

Between the generator 27 and the mirror 43, and between the mirror 43 and the receiver 33, the laser beam passes through holes 49 that are machined in the fan disk.

According to another advantageous characteristic of the invention, one of the filters, specifically here the first filter 29, includes a ring in which there is an alternation of polarizing zones 51 and of non-polarizing zones 52, thus making it possible to obtain a periodic succession of polarizations representative of a measurement value and of a reference value, respectively.

Figure 4:
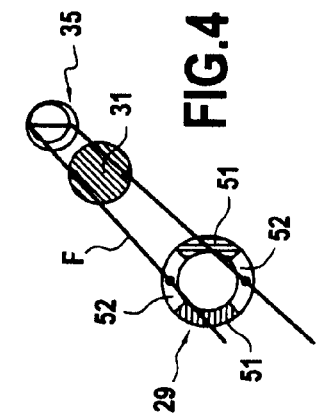
FIG. 4 is a diagrammatic view showing the measurement of a reference value.

Operation is explained with reference to FIGS. 4 and 5.

The generator emits a beam perpendicular to the axis of rotation, which beam is directed towards the frustoconical mirror 43. It is therefore returned parallel to the axis X. This beam passes a first time through said first filter 29 that is situated upstream, and then through said second filter 31 that is situated downstream. It is reflected twice by the frustoconical mirror 35 and returned parallel to itself. It passes once more through said second filter 31 and finally through the first filter 29 before being reflected a last time towards the receiver 33. Said first filter has four sectors 51, 52 each occupying 90° and having the following polarizations:

vertical polarization;
no polarization;
horizontal polarization; and
no polarization.

Let $I_0$ be the intensity of the laser beam emitted by the generator 27. When the angular position of the shaft 25 relative to the beam is as shown in FIG. 4 (no attenuation due to the first filter), then the intensity value measured by the receiver 33 constitutes a reference value that is not greater than $I_0/2$.

Figure 5:
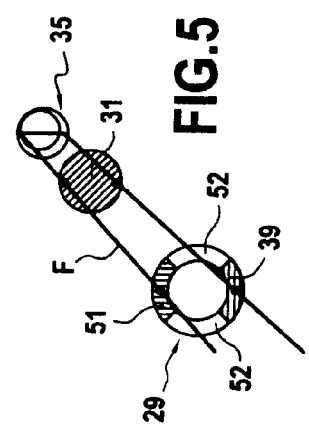
FIG. 5 is a diagrammatic view showing the measurement of a value representative of the twisting of the shaft.

When the angular position of the shaft 25 relative to the beam F is as shown in FIG. 5, then the intensity value measured is a function of the reference value and of the twist angle θ.

The receiver 33 thus emits a variable signal. The min/max ratio of this signal is representative of $\sin^2(2\theta)$. A direct measurement is thus obtained of the twist θ. Furthermore, the frequency of this signal is representative of the speed of the shaft. Knowing the speed and the twist (and thus the torque) makes it possible at all times to know the mechanical power being transmitted by the shaft.

The invention claimed is:

1. A device for measuring a twist of a rotating shaft, the device comprising:
   a laser beam generator which emits a laser beam;
   first and second polarizing filters secured to the shaft and spaced apart from each other; and
   a laser radiation receiver, said laser beam generator being installed so that said laser beam emitted by the laser beam generator passes through the first and second filters, and said laser radiation receiver being installed to receive said beam after said beam has passed through both of the first and second filters,
   wherein a reflection system is installed in a vicinity of the second filter to reflect the beam that has passed through the first and second filters and return the beam parallel to itself towards said receiver through the first and second filters, said beam passing through the first and second filters being substantially parallel to an axis of rotation of said shaft,
   wherein said reflection system comprises a 45° frustoconical mirror,
   wherein one of the filters comprises a ring in which polarizing zones and non-polarizing zones alternate so as to obtain a periodic succession of polarizations representative of a measurement value and of a reference value, respectively, and
   wherein the twist of the rotating shaft is measured based on a ratio between the measurement value and the reference value.

2. A device according to claim 1, wherein the two filters are mounted on said shaft in the vicinity of respective ones of its two ends.

3. A device according to claim 1, wherein said generator and said receiver are arranged facing each other perpendicularly to the axis of rotation of said shaft and on either side thereof, in such a manner that their optical axes are in alignment, and wherein another 45° frustoconical mirror carried by said shaft is placed between said emitter and said receiver.

4. A device according to claim 1, wherein said shaft is hollow and in that it houses said filters.

5. A device according to claim 1, wherein said shaft houses said reflection system.

6. A device according to claim 3, wherein said shaft is hollow and houses said filters and said other frustoconical mirror.

7. A device according to claim 1, associated with a fan shaft in an airplane turbojet.

* * * * *